T. J. CLEMENT.
COVER FOR TEAPOTS.
APPLICATION FILED SEPT. 12, 1908.

930,938.

Patented Aug. 10, 1909.

WITNESSES

INVENTOR
Thomas J. Clement
BY
ATTORNEYS

UNITED STATES PATENT OFFICE.

THOMAS JEFFERSON CLEMENT, OF ATLANTIC CITY, NEW JERSEY.

COVER FOR TEAPOTS.

No. 930,938.      Specification of Letters Patent.      Patented Aug. 10, 1909.

Original application filed June 13, 1908, Serial No. 438,305. Divided and this application filed September 12, 1908. Serial No. 452,729.

*To all whom it may concern:*

Be it known that I, THOMAS J. CLEMENT, a citizen of the United States, and a resident of Atlantic City, in the county of Atlantic and State of New Jersey, have invented a new and Improved Cover for Teapots, of which the following is a full, clear, and exact description.

This invention relates to teapots, and particularly to the covers thereof.

The object of the invention is to produce a teapot having a cover of improved form, especially adapted for holding the tea strainer when not in actual use.

The invention described below is a division of the invention described in my patent, the application for which had the Serial No. 438,305, filed June 13, 1908.

The invention consists in the construction and combination of parts to be more fully described hereinafter and particularly set forth in the claims.

Reference is to be had to the accompanying drawings forming a part of this specification, in which similar characters of reference indicate corresponding parts in both the figures.

Figure 1:
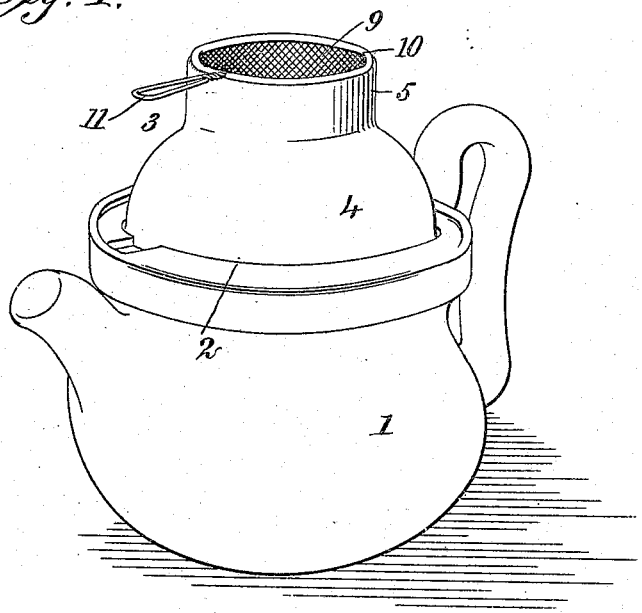
Figure 2:
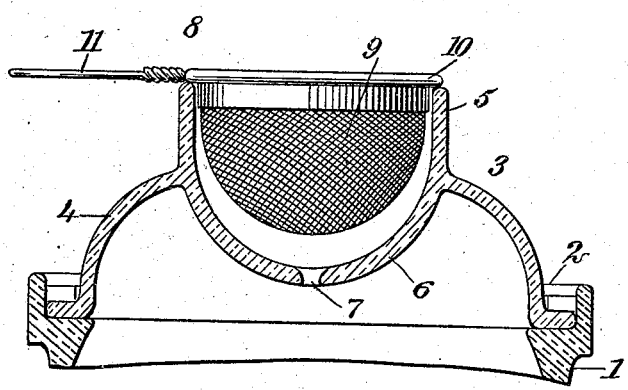

Figure 1 is a perspective showing a teapot provided with a cover constructed according to my invention; and Fig. 2 is a vertical section taken through the cover and showing the upper portion of the teapot.

Referring more particularly to the parts, 1 represents a teapot, the mouth or opening 2 of which may be constructed in any suitable manner. In this opening 2, the cover 3 seats. The lower portion of this cover is formed into a rounded dome 4, as indicated, and centrally disposed on this dome there is formed a cup 5, the bottom 6 of said cup being depressed below the upper portion of the dome, as indicated most clearly in Fig. 2. The upper portion of the cup 5, that is, the portion of the cup which projects above the dome, is of substantially cylindrical form, while the bottom of the cup is of substantially spherical form, as shown. The bottom of the cup is provided with a drip opening 7 for a purpose which will appear hereinafter. The cup 5 forms a holder for the strainer 8. Said strainer is of a common form having a hemispherical body 9 formed of fine wire mesh or similar material, said body 9 being attached to a metal ring 10 from which a suitable handle 11 extends radially as shown. The strainer is normally held in the cup 5, the ring 10 resting on the lip of the cup, as shown, but when the tea is to be served it is then placed over the cup into which the tea is being poured. When the strainer is replaced in the cup 5, the tea leaves which it may hold will drip into the bottom of the cup and the drippings will pass through the opening 7 back into the interior of the pot. Inasmuch as the drip opening 7 is very small, the cover 3 performs the usual function of the cover, but at the same time by reason of the cup 5, it provides an effective holder for the strainer.

While I have described my invention particularly as a cover for a teapot, it should be understood that it is useful in connection with any pot in which a beverage may be brewed from leaves or grindings; or indeed, it may be used in any connection where the contents of a serving vessel should be strained before serving.

That part of the cup which projects above the dome constitutes a knob to be grasped in the hand to enable the cover to be removed. The tea strainer is used like an ordinary tea strainer, but is simply held in the holder when not in actual use.

Having thus described my invention, I claim as new and desire to secure by Letters Patent,—

1. A holder for a tea strainer having a body forming a cover for a teapot, said body having a centrally disposed permanently open cup in the upper side thereof which receives the strainer.

2. A cover for a teapot or the like, having a dome with a centrally disposed permanently open cup projecting above said dome constituting a receiver for a strainer, and constituting a knob for lifting said cover, said cup being of substantially cylindrical form above said dome and having a drip opening in the bottom thereof.

In testimony whereof I have signed my name to this specification in the presence of two subscribing witnesses.

THOMAS JEFFERSON CLEMENT.

Witnesses:
  WILLIAM MABRY,
  CHARLES U. DE HART.